No. 761,765. PATENTED JUNE 7, 1904.
J. C. DONNELLY.
MACHINE FOR BOXING MATCHES.
APPLICATION FILED NOV. 7, 1901.
NO MODEL. 5 SHEETS—SHEET 1.

WITNESSES:
A. V. Groupy
S. Nolan

INVENTOR
Joseph C. Donnelly
BY John R. Nolan
ATTORNEY

No. 761,765. PATENTED JUNE 7, 1904.
J. C. DONNELLY.
MACHINE FOR BOXING MATCHES.
APPLICATION FILED NOV. 7, 1901.
NO MODEL. 5 SHEETS—SHEET 2.

WITNESSES: INVENTOR
Joseph C. Donnelly
BY John R. Nolan
ATTORNEY

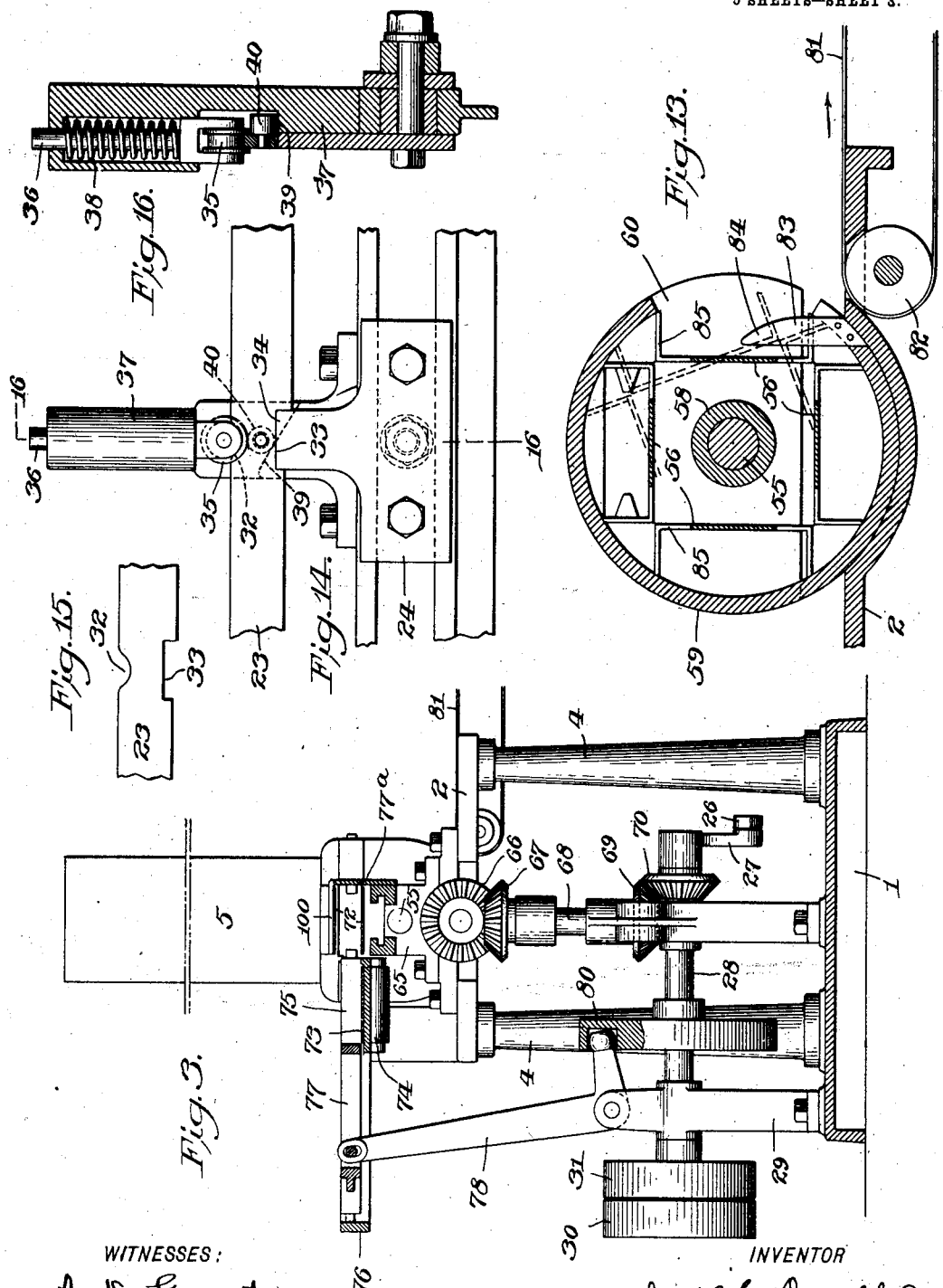

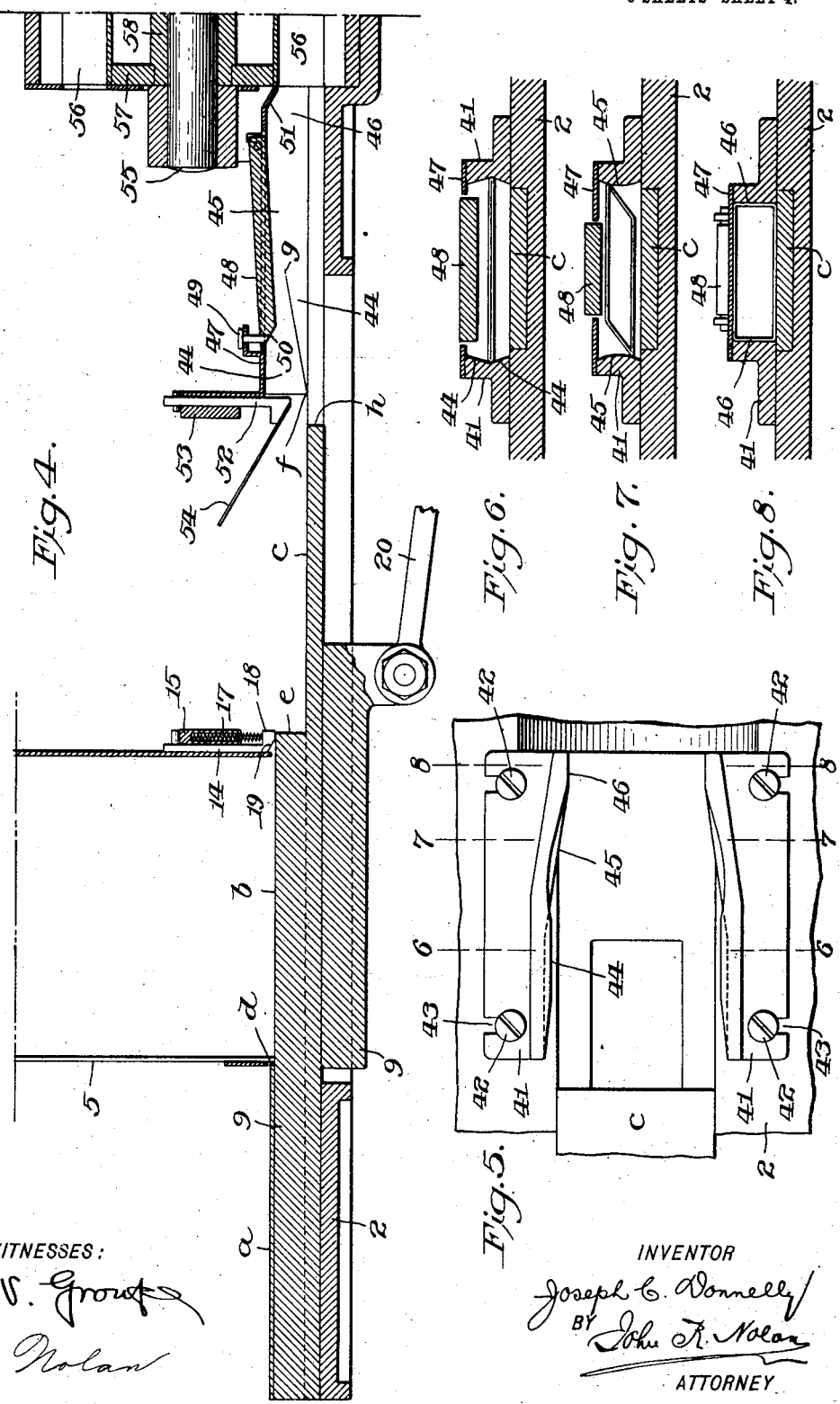

No. 761,765. PATENTED JUNE 7, 1904.
J. C. DONNELLY.
MACHINE FOR BOXING MATCHES.
APPLICATION FILED NOV. 7, 1901.
NO MODEL. 5 SHEETS—SHEET 5.
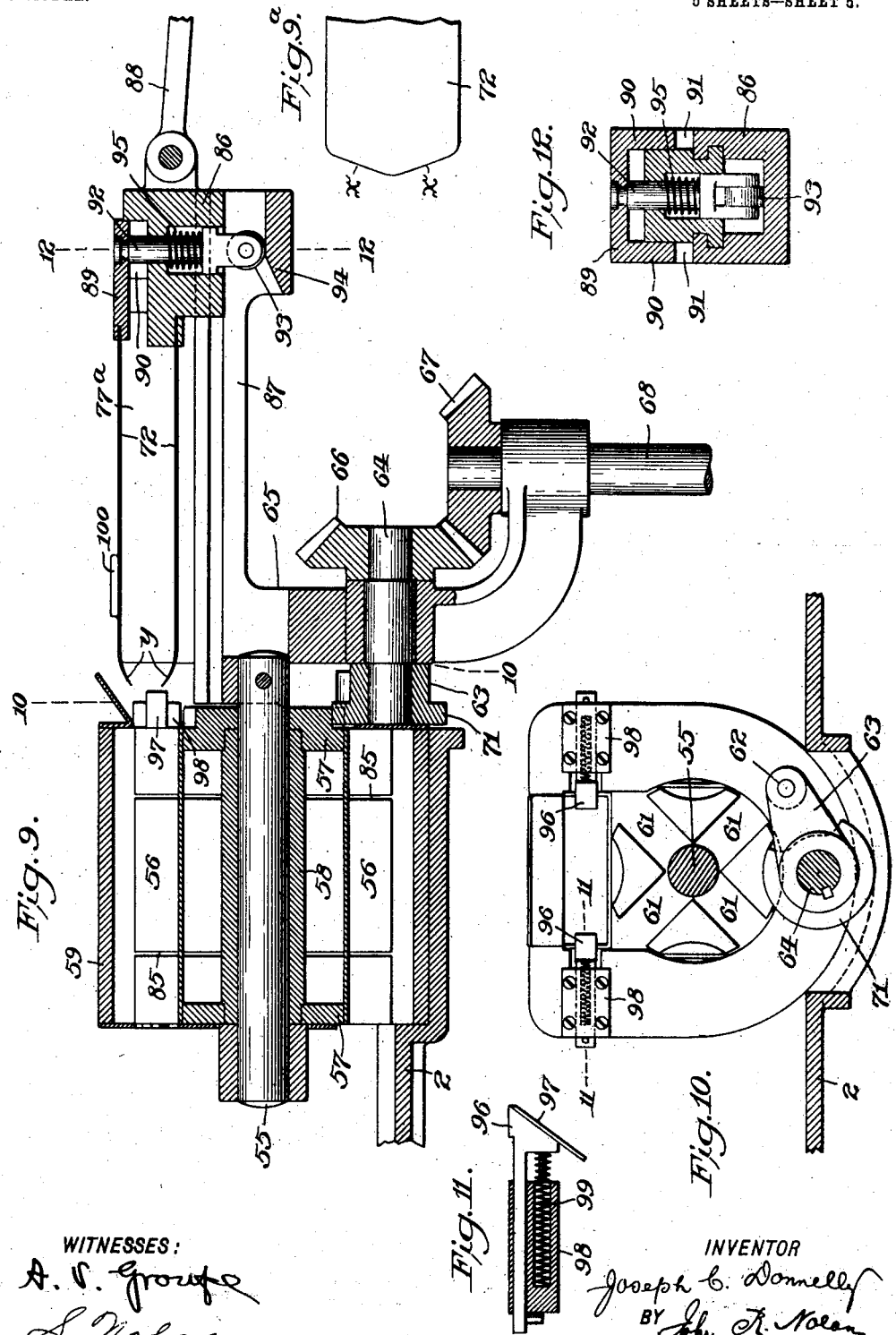
WITNESSES:
INVENTOR
Joseph C. Donnelly
BY John R. Nolan
ATTORNEY No. 761,765. Patented June 7, 1904.

UNITED STATES PATENT OFFICE.

JOSEPH C. DONNELLY, OF PHILADELPHIA, PENNSYLVANIA, ASSIGNOR TO THE DIAMOND MATCH COMPANY, OF NEW YORK, N. Y., A CORPORATION OF ILLINOIS.

MACHINE FOR BOXING MATCHES.

SPECIFICATION forming part of Letters Patent No. 761,765, dated June 7, 1904.

Application filed November 7, 1901. Serial No. 81,387. (No model.)

*To all whom it may concern:*

Be it known that I, JOSEPH C. DONNELLY, a citizen of the United States, residing in the city and county of Philadelphia and State of Pennsylvania, have invented certain new and useful Improvements in Machines for Boxing Matches, of which the following is a full, clear, and exact description, reference being had to the accompanying drawings, forming a part of this specification.

This invention relates to that class of boxing-machines in which matches or other articles are assembled in the tray and shuck form of box.

The primary object of the invention is to provide a simple and efficient construction and organization of mechanism whereby collapsed shucks shall be expeditiously opened and filled trays applied thereto.

A preferred embodiment of my invention is illustrated in the annexed drawings and hereinafter fully described, the novel and characteristic features of the invention being defined in the claims.

Figure 1:
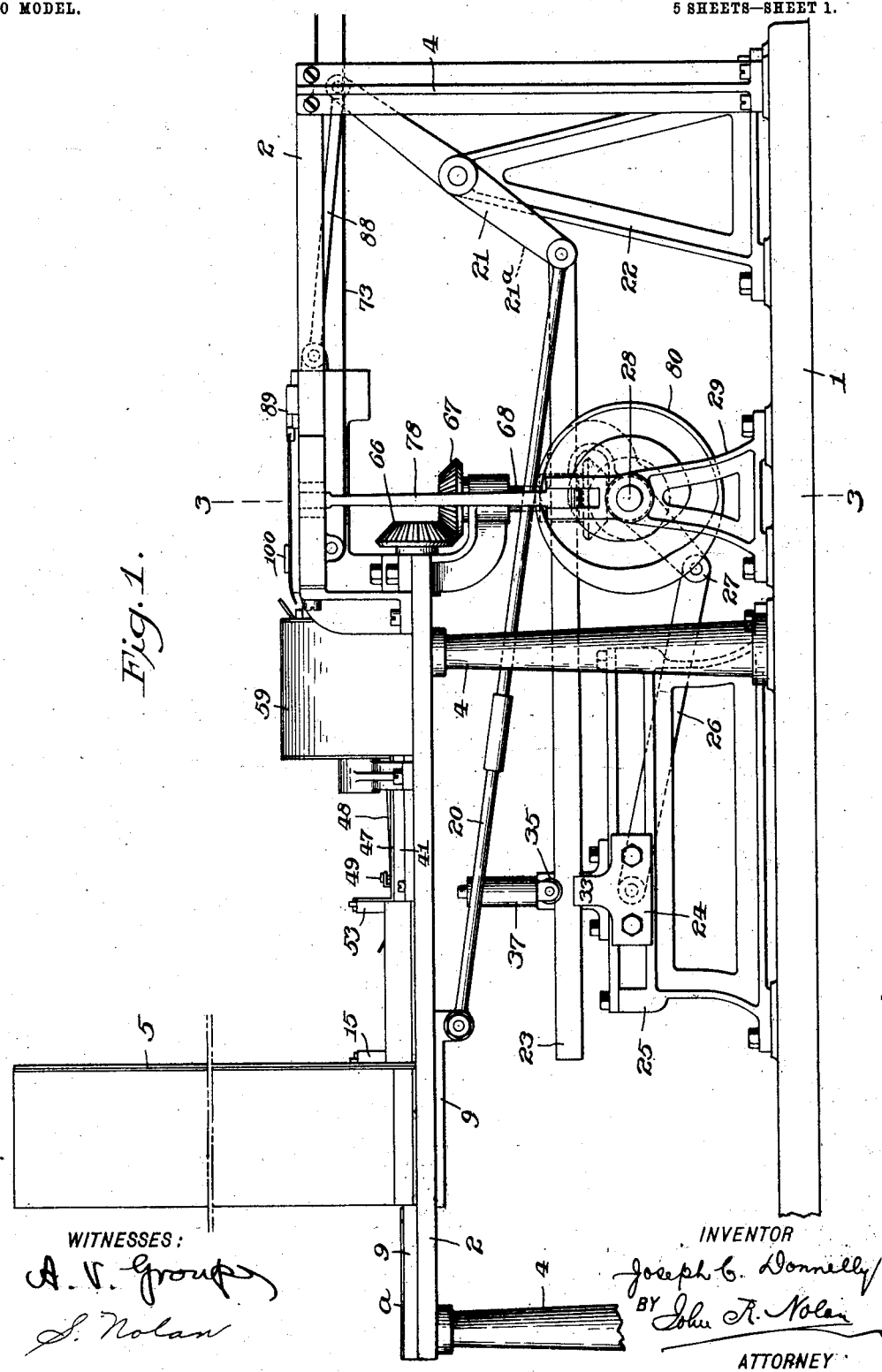
Figure 2:
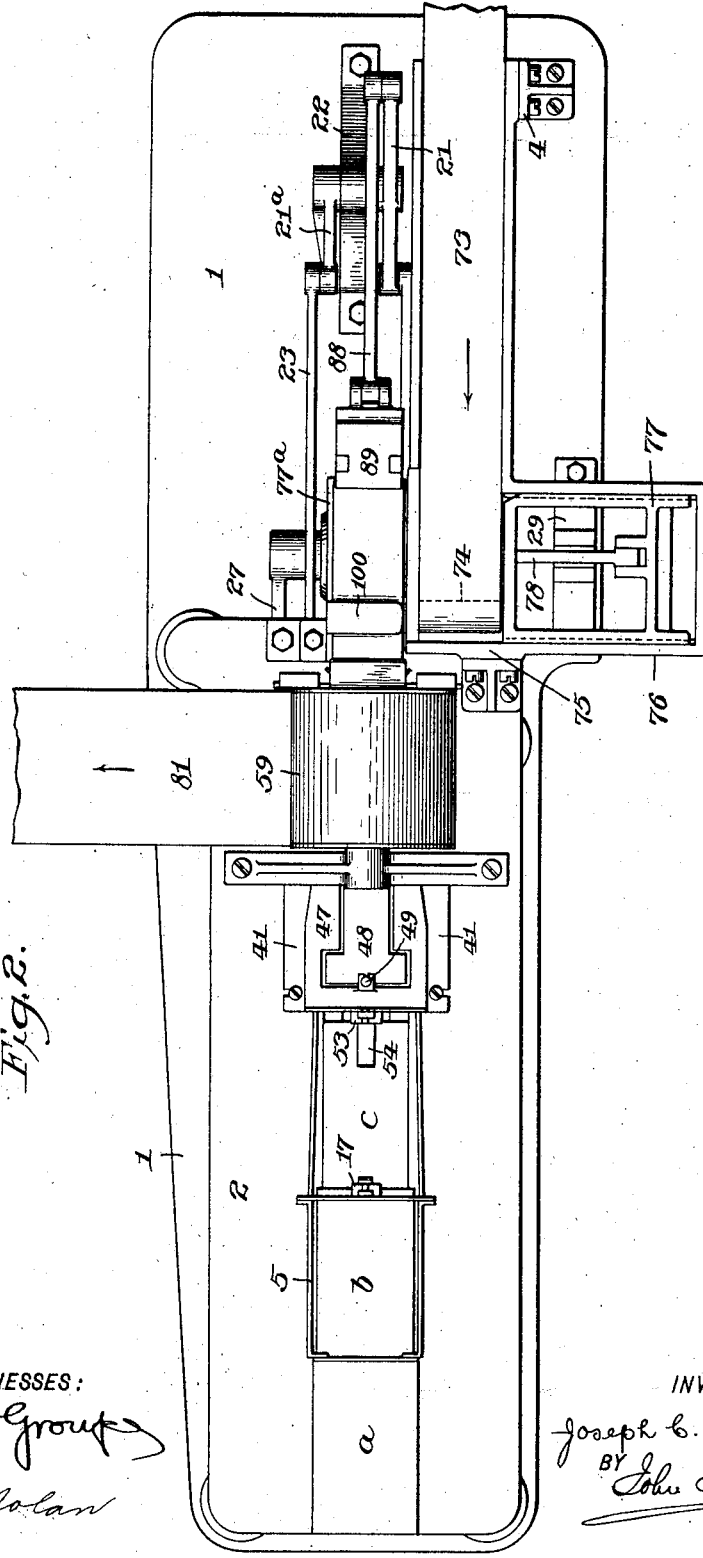

In the drawings, Figure 1 is a side elevation of my improved boxing-machine. Fig. 2 is a plan thereof. Fig. 3 is a transverse section as on the line 3 3 of Fig. 1. Fig. 4 is a longitudinal vertical section, enlarged, through the shuck-carriage, shuck-opener, and adjuncts. Fig. 5 is a plan of the shuck-opener with its cap or cover plate removed. Figs. 6, 7, and 8 are transverse sections through said opener, including the cap or cover plate, as on the lines 6 6, 7 7, and 8 8, respectively, of Fig. 5, showing the progressive action of the opener upon the shuck. Fig. 9 is a vertical section, enlarged, through the open shuck-receiver, the tray-feeding jaws, and adjuncts. Fig. 9ª is a plan of the free end of one of the clamping-jaws of the tray-feeder. Fig. 10 is a transverse vertical section as on the line 10 10 of Fig. 9. Fig. 11 is a sectional detail as on the line 11 11 of Fig. 10. Fig. 12 is a similar detail as on the line 12 12 of Fig. 9. Fig. 13 is a transverse section of the shuck-receiver, showing a portion of the take-off belt. Fig. 14 is a detail of the reciprocating cross-head and the intermittent connections between the same and the operating-bar for the shuck-carriage and tray-feeder. Fig. 15 is a detail of said bar. Fig. 16 is a vertical section as on the line 16 16 of Fig. 14.

1 represents a bed-plate, and 2 a table sustained thereon by columns 4. On this table is supported a vertically-disposed hopper 5 of suitable shape and size to contain a pile of collapsed shucks. Slidingly fitted to longitudinal guides in the table is a carriage 9, which affords a bottom for the hopper and removes the shucks successively therefrom. The upper side of the carriage has three surfaces, $a$, $b$, and $c$, on different horizontal planes with the interposed shoulders or abutments $d$ and $e$. This carriage is reciprocated beneath the hopper at predetermined intervals. When it is at the limit of its stroke to the left, (viewing the machine in the position illustrated in the drawings,) the portion $b$ lies beneath the hopper and the lowermost shuck rests thereon, the shoulder $d$ being immediately in rear of the shuck. When the carriage is moved in the opposite direction, the shoulder taking against the opposing edge of the shuck moves it bodily through and beyond the opening at the forward lower side of the hopper, the next lowermost shuck then resting upon the raised surface $a$ of the carriage. When the carriage is retracted, this lowermost shuck drops upon the portion $b$ in position to be expelled from the hopper in the next succeeding stroke of the carriage, and at the same time the shuck last previously expelled drops upon the surface $c$ and in proximity to the shoulder $e$. Thus the shucks are withdrawn one by one from the hopper by the carriage and deposited upon the surface $c$.

On the forward side of the hopper is a spring-actuated latch 14, which is constructed and arranged to permit the egress of the shuck during the forward stroke of the carriage and to prevent the return of said shuck during the reverse stroke of the carriage by affording an abutment therefor, and thus insuring the disposition of the shuck upon the surface c. This latch comprises a vertically-disposed stem shouldered at its lowered end and slidingly fitted to a guide-bracket 15, located on the forward wall of the hopper directly above the discharge-opening. Fitted to a vertical socket in the bracket is a spring 17, which acting upon the shouldered portion 18 of the stem maintains the same yieldingly depressed across the discharge-opening. The inner edge of this shouldered portion is beveled, as at 19. The shuck as it is advanced through the discharge-opening takes against the opposing beveled portion of the latch and raises the latter, maintaining it raised until the shuck escapes the same, whereupon the latch resuming its down position serves as a backstop for said shuck during the reverse stroke of the carriage.

The carriage 9 is connected, by means of a link 20, with one arm of a rocking lever 21, which is fulcrumed on a pedestal 22 at the end of the machine opposite to that where the hopper is located. Fixed to the pivot-stud of this lever is an arm 21$^a$, to which is pivotally connected one extremity of a horizontally-disposed traverse-bar 23. The opposite end of this bar is supported upon a cross-head 24, slidingly fitted to guideways in a frame 25, provision being had whereby the bar may be periodically coupled to and uncoupled from the cross-head, so as to be reciprocated thereby at predetermined intervals. This cross-head is connected, by means of a link 26, with a crank-arm 27 on the main shaft 28, whereby when power is applied to the latter the cross-head is horizontally reciprocated. The main shaft has its bearings in pedestals 29 on the bed-plate and is provided with fast and loose pulleys 30 31, respectively.

A simple and efficient coupler for the traverse-bar and cross-head is as follows: Suitably located in the upper and lower edges of the bar are two sockets 32 33, respectively, the upper socket being concave and the lower socket rectangular. The lower socket corresponds with a vertical projection 34 on the cross-head, so that when said projection is coincident with the socket they register with each other. A flanged pressure-roller 35 engages the upper socket when the projection coincides with the lower socket, and thereby insures the registry of the projection with the latter socket. This roller is journaled in the bifurcated lower end of a stem 36, which is slidingly fitted to and guided in a vertical extension 37 of the frame 25. A spring 38, encircling the stem and bearing upon the lower shouldered end thereof and against a shoulder in said extension, maintains the roller normally depressed. On this extension is an incline or cam 39, which is located in the path of a lateral stem or roller 40 on the bar. By this construction it will be seen that the traverse-bar will be coupled with the cross-head when the socket of the bar is directly below the pressure-roller during the stroke of said head toward the right and that therefore the bar will be bodily carried onward by the head and back again until the stud or roller 40 contacts with the opposing cam, whereupon the stud or roller riding up the cam will raise the bar and disengage the socket from the projection of the cross-head, in consequence of which the cross-head will complete its stroke independently of the traverse-bar, the latter thus remaining quiescent. When the cross-head in its return stroke reaches a position below the pressure-roller, the bar will be again connected with the cross-head for a repetition of the reciprocation above described. Thus the bar will be reciprocated at predetermined intervals and the rocking lever and its connections will only be actuated during corresponding periods of time.

Arranged on the table directly in the path of the reciprocating carriage is a device termed a "shuck-opener," into which each shuck as it is withdrawn from the hopper is introduced, and thereby opened by pressure against the opposing lateral edges of the advancing shuck. This shuck-opener includes in its construction two angle-bars 41, arranged on opposite sides of the guideway in which the shuck-carriage slides. The vertical portion of each bar is disposed adjacent the edge of the guideway, while the horizontal or flange portion is secured to the table by screws 42, the screw-holes 43 therefor being elongated to permit the adjustment of the bar laterally in respect to the guideway. The receiving portion of the inner or acting wall of each bar is recessed diagonally from its lower corner $f$ to a point $g$ (see Fig. 4) about midway between the upper and lower edges of the wall to afford two oppositely-inclined surfaces 44, which merge at such point in a convex portion 45 and which portion in turn merges in a vertical surface 46 at the delivery end of the bar. The curved surface of the wall is inclined inwardly above the path of movement of the carriage, and the vertical surface extends parallel to such path. The two bars are so disposed that the space between the lower forward corners thereof is equal to the width of the collapsed shuck, or substantially so, and the space between the vertical surfaces is equal to the width of the shuck when opened, or substantially so. Hence as the collapsed shuck is advanced by the carriage the leading corners of the shuck enter the lower corners $f$ of the two bars and are thereby directed up the diagonal recesses in the flat condition. (See Fig. 6.) These edges then contact with the convex surfaces 45 of the bars, and as such surfaces converge it follows that the shuck is gradually pressed inward and opened thereby (see Fig. 7) until it reaches and contacts with the parallel surfaces 46, when it is caused thereby to assume its fully-open or rectangular condition. (See Fig. 8.) Consequently when the shuck has passed through the opener the former is completely open.

The foregoing-described shuck-opening operation is easy and effective, and I have found by experience that substantially the internal contour indicated of the opener is essential to the attainment of satisfactory results. Upon the two bars is a cap or cover plate 47, provided with a section 48, hinged at its rearward end, so as to drop by gravity at its forward end into the upper portion of the opener, and thus bear upon the shuck within the latter. A suitable stop-pin 49 is provided to limit the downward movement of the free end of the hinged section, which free end, as will be observed, is preferably beveled, as at 50.

When the initial shuck is subjected to the action of the opener, the open shuck rests upon the portion $c$ of the carriage. When the carriage is retracted, the shuck being unsupported thereby is depressed by the section 48 upon that part of the table underlying the shuck. Hence in the next stroke of the carriage to introduce a succeeding shuck within the opener the advancing end $h$ of the carriage bears against the opposing lower edge of the open shuck and forces the latter outwardly through the opener. The cap 47 is provided at the discharge portion of the opener with an incline or cam 51, which deflects downward the leading end of the open shuck and insures its exit from the opener in horizontal position.

At the mouth of the opener is a vertically-movable back-stop 52, comprising a stem slidingly fitted to a guide 53 at the entrance to the opener and provided at its lower extremity with an outwardly and upwardly inclined wing or mouth portion 54. The stop with its flaring mouth portion being freely movable vertically, permits the ingress of the shuck to the opener during the inward stroke of the feeder. When the shuck has passed into the opener and escaped the stop, the latter, dropping, acts as a barrier to prevent retrogression of the open shuck during the reverse stroke of the carriage.

Adjacent the discharge end of the opener is an intermittently-rotatable device termed a "shuck-receiver." This device in its preferred construction includes a series of rectangular pockets rotatably mounted on a shaft 55, so as to be movable successively to and past the opener. In the present instance there are four of these pockets, and hence the holder is moved a quarter-turn in each step. Each pocket comprises a channel-piece 56, supported at its respective ends on heads 57, connected by a sleeve 58, mounted on the shaft. The several pockets are encased by a cylinder 59, which is supported by the table. One side of the cylinder is provided with a discharge-opening 60, hereinafter referred to.

Any suitable means may be employed to advance the shuck-receiver from pocket to pocket. In the present instance I use for this purpose the Geneva stop movement, as follows: On one of the end heads are formed four radial slots or recesses 61, adapted to be successively engaged by a laterally-projecting stud 62 on a rotating arm 63. This arm is affixed to a shaft 64, having its bearings in a suitably-disposed bracket 65, which shaft is equipped with a bevel-wheel 66 in mesh with a similar wheel 67 on the upper end of a vertical shaft 68. The latter shaft is provided at its lower end with a bevel-wheel 69, which gears with a like wheel 70 on the main driving-shaft. Hence during the operation of the latter the motion is transmitted therefrom to the shaft 64, carrying the arm 63. In a part of its revolution the stud 62 on said arm registers with one of the slots 61 in the end head, and thereby turns said head, and, perforce, the pocketed receiver, a quarter-turn, thereupon clearing the slot and turning idly the remainder of the revolution until it reëngages the next opposing radial socket for a succeeding operation.

The arm 63 is provided with a sector 71, the periphery of which is concentric with the arm. The portions of the end head between the mouths of the sockets are hollowed out to afford sufficient clearance for the sector during the idle movement of the stud. During such idle movement the receiver is at rest and a pocket thereof is in line with the opener. At this stage the open shuck is ejected from the opener and forced into the opposing pocket by the reciprocating carriage. In the next partial turn of the receiver another pocket is brought longitudinally in line with the opener and another open shuck is introduced thereto, as before, and so on successively.

Adjacent the receiver is a tray-feeding mechanism, including a pair of tray holding and releasing jaws 72, which are constructed and arranged to be moved longitudinally into and from the pockets of the shuck-receiver. When the jaws are in their outermost position, a filled match-tray is introduced thereto. The jaws upon their being moved toward the receiver clamp the interposed tray and convey it into the open shuck in the opposing pocket of the receiver. This done, the jaws are retracted for a succeeding operation. These jaws and their supporting and operating mechanism will be presently described.

Filled match-trays are supported end to end upon an endless carrier 73, which is mounted on rollers 74 at one side of the machine and driven in the direction indicated by the arrow in Fig. 2, so as to convey the trays successively to a position adjacent the open tray-holding jaws, an abutment 75 being provided to check the leading tray directly in alinement with the jaws. Fitted to horizontal guides in a suitably-disposed guide-frame 76 is a reciprocating plunger 77, which is adapted in its action to push the said leading tray between the jaws. A plate 77ª, arranged adjacent to the jaws and to the path of movement of the plunger, affords an abutment for the tray pushed between the jaws and insures the alinement of the tray with the pocket of the receiver. The trays are advanced one by one in front of the plunger by the traveling carrier and then successively introduced by the plunger to the jaws.

The plunger is connected to the long arm of a bell-crank lever 78, which is fulcrumed to the pedestal 29, the short arm of the lever being engaged with a properly-timed face-cam 80 on the main shaft. (See Figs. 1 and 3.) Hence when the machine is in operation the lever 78 is oscillated and the plunger thereby horizontally reciprocated, with the result stated.

The filled match-trays may be deposited upon the carrier by an attendant or by suitable automatic mechanism.

During the intermittent rotation of the receiver the filled match-boxes are successively ejected therefrom by way of the lateral opening 60 in the casing and deposited upon an endless take-off belt 81, passing round suitably-disposed rollers, one of which is indicated at 82, Fig. 13. A convenient means to effect the removal of the boxes from the receiver comprises a vertically-disposed post (or posts) 83, affixed within the cylinder adjacent to the discharge-opening. The upper outer edge of the post is beveled or cam-shaped, as at 84, and it is so disposed that the bottom of each match-box as it is advanced toward the opening in the cylinder rides upon the bevel edge of the post and is progressively moved thereby from the pocket and ejected bodily through such opening. The walls and bottoms of the respective pockets are slotted, as at 85, to afford the requisite clearance for the post during the rotation of the receiver.

The tray-feeding mechanism herein illustrated is of the character shown and described in a pending application, Serial No. 23,533, filed by me July 13, 1900, as follows: The jaws 72 comprise two thin plates, preferably of elastic material, of sufficient length to extend at their forward or free ends slightly beyond the interposed tray and of sufficient width to cover and protect the heads of the matches contained in the tray. The free ends of the jaws are made very thin, and they are rounded or tapered, as at $x$, and turned inward, as at $y$. (See Figs. 9, 9ª.) These jaws are directed to and in line with the uppermost shuck-containing pocket of the receiver, to the end that when the jaws are projected forward they will enter the opposing shuck and introduce the filled tray thereto. The inwardly-curved leading ends of the jaws present inclined surfaces to the edges of the shuck, and thus facilitate the entrance of the jaws and tray to the latter. These ends being extremely thin and yielding will straighten out during the retraction of the jaws, and thus the matches in the tray will not be disturbed. The jaws are carried by a cross-head 86, which is slidingly fitted to a suitably-located guide-frame 87 on the bracket 65, above referred to, and is connected, by means of a link 88, with the upper arm of the rocking lever 21, whereby during the operation of the latter the cross-head is moved toward and from the receiver, so as to introduce the jaws to the open shuck in its path. The lower jaw is affixed directly to the cross-head, while the upper jaw is supported by a vertically-movable plate 89 on the latter, so as to be movable up and down in respect to the lower jaw, said plate being preferably provided with depending guide-pins 90, which are fitted to vertical guide-grooves 91 in the cross-head. The plate is provided with a depending pin 92, which extends freely through and below the cross-head, being provided on its lower or free end with an antifriction-roller 93, which when the cross-head is retracted bears upon a cam-piece 94 at the outer end of the guide-frame 87, and thereby maintains the plate and its jaw raised. Confined within the cross-head is a spiral spring 95, which, encircling the pin, acts to maintain it normally depressed. When the jaw is raised through the instrumentality of the cam 94, there is ample space between the two jaws to permit the free passage of a filled match-tray therebetween. When, however, the jaws are being advanced toward the pocketed receiver, the pin 92 clears the cam, and in consequence the upper jaw is moved down upon the tray, so as to clamp it in place and insure its transference into the opposing open shuck contained in the pocket of the receiver. In the return movement of the cross-head the jaws, being very light and yielding, are withdrawn from the tray, thus leaving the latter incased by the shuck. As the cross-head reaches its original position the pin rides upon the cam in its path, thus raising the upper jaw and maintaining it in position for a repetition of the operation above described upon a succeeding tray.

In order to obviate any liability of the jaws in their return movement retracting the tray from the shuck into which it has just been slid, I mount on the end of the casing 59 a pair of spring-actuated bolts 96, with beveled or inclined end pieces 97, which project slightly into the path of the tray as it is being introduced to the shuck. The tray in its passage to the shuck abuts against the opposing beveled ends of the bolts and presses them aside, and upon clearing the bolts they resume their normal position to afford a return-barrier for the tray.

The bolts are slidingly fitted to guidebrackets 98 and are maintained normally projected by suitably-disposed springs 99. (See Fig. 11.)

When the jaws are retracted from the receiver, the tendency of the free end of the upper jaw, due to its inherent elasticity, is to spring upward and rebound, particularly when the machine is being rapidly operated, which vibration is apt to displace the matches within the tray as the latter is being interposed between the jaws by the reciprocating plunger 77. To obviate this difficulty, I arrange directly in front of the receiver a transverse abutment 100, which, overhanging said upper jaw, receives the upward pressure of the latter as it is retracted. In the present instance this overhanging abutment is an angular bend of the tray-abutment 77ª, previously described.

I claim—

1. The combination with a source of shuck-supply, a shuck-carriage, and actuating means therefor, of a shuck-opener in the path of the carriage, said opener including two side members having at their receiving portions diagonally-recessed surfaces, and at their delivery portions parallel vertical surfaces, said surfaces being connected by convex converging surfaces.

2. The combination with a source of shuck-supply, a shuck-carriage, and operating means therefor, of a shuck-opener in the path of the carriage, said opener including two side members having at their receiving portions diagonally-recessed surfaces, and at their delivery portions parallel vertical surfaces, said surfaces being connected by convex converging surfaces, and including also a depressor for acting upon the shuck within the opener.

3. The combination with a source of shuck-supply, a shuck-carriage, and operating means therefor, of a shuck-opener in the path of the carriage, a yielding depressor adapted to act upon one end of the shuck within the opener, and a depressing-cam adapted to act upon the opposite end of said shuck.

4. The combination of a source of shuck-supply, a shuck-carriage, means for operating the latter, a shuck-opener in the path of the carriage, a shuck-receiver, means for operating the same, a tray clamping and releasing device movable into and from the receiver, means for operating said device, and means for feeding individual filled trays thereto.

5. The combination of a source of shuck-supply, a shuck-carriage, means for operating the latter, a shuck-opener in the path of the carriage, a shuck-receiver, means for operating the same, a tray clamping and releasing device movable into and from the receiver, means for operating said device, and means for ejecting the trays and shucks from said receiver.

6. In an organized machine of the character described, the combination with a source of shuck-supply, of a shuck-carriage, a shuck-opener in the path of said carriage, an intermittently-movable shuck-receiver provided with a plurality of pockets movable successively to and past the discharging end of the opener, a reciprocating clamping and releasing device for grasping the filled trays and thrusting them into said pockets successively, a primary driving mechanism, and operative connections between the same and the shuck-receiver and the clamp device, whereby are effected the respective movements of said carriage, receiver and clamp device relatively to each other.

7. In an organized machine of the character described, the combination with a source of shuck-supply, of a shuck-carriage, a shuck-opener in the path of said carriage, an intermittently-movable shuck-receiver provided with a plurality of pockets movable successively to and past the discharging end of the opener, a reciprocating clamping and releasing device for grasping the filled trays and thrusting them into said pockets successively, means for discharging the shucks and trays from the receiver, a primary driving mechanism and operative connections between the same and the shuck-receiver, a clamp device and discharging means, whereby are effected the respective movements of said carriage, receiver, clamp device and discharging means relatively to each other.

8. The combination of a rotatable shuck-receiver including a series of pockets having open tops and ends, a stationary casing inclosing said pockets and having a discharge-opening with which the open tops of said shucks successively aline, means for supplying open shucks endwise to said pockets, means for introducing filled trays to the shucks within the pockets, and a stationary cam mounted within said casing adjacent to the opening thereof and adapted, during the rotation of the pockets, to eject their contained trays and shucks through said opening.

9. The combination of a rotatable shuck-receiver including a series of pockets having open tops and ends and having slotted bottoms and side walls, a stationary casing inclosing said pockets and having a discharge-opening with which the open tops of said shucks successively aline, means for supplying open shucks endwise to said pockets, means for introducing filled trays to the shucks within the pockets, and a stationary cam-post mounted within said casing adjacent to the opening and in the path of the slotted portions of the pockets so as to act upon the trays and shucks within the respective pockets during the rotation of the receiver, and thereby eject said trays and shucks through the said opening.

10. The combination with a source of shuck-supply, a shuck-carriage, means for operating the latter, a shuck-opener in the path of the carriage, a shuck-receiver, means for operating the same, tray clamping and releasing devices movable into and from the receiver, means for operating said devices, a tray-conveyer, a plunger for forcing individual trays therefrom to the said device, and means for operating said plunger.

11. The combination with a source of shuck-supply, a reciprocating shuck-carriage, a shuck-opener in the path thereof, an intermittently-rotatable shuck-receiver adjacent thereto, and a reciprocating tray-feeder for supplying trays to the said receiver, of a main drive-shaft, operative connections between the same and the receiver, a reciprocating head, a rock-lever, a connection between one arm thereof and the tray-feeder, a bar connected with the other arm of the lever, means for periodically coupling and uncoupling said bar and head, and a connection between the said lever and the shuck-carriage.

12. A shuck-opener having two side members the inner or acting wall of each of which comprises a diagonally-recessed portion, a convex portion, and a plane portion, the convex portions of the two walls converging from the recessed to the plane portions, substantially as described.

13. The combination with a shuck-receiver, of tray-feeding mechanism therefor including an elastic clamping-jaw, means for reciprocating said feeder, and an abutment overhanging the said jaw and adapted to receive the upward pressure of the latter.

14. The combination with the hopper and the yielding latches at the discharge-opening thereof, of the reciprocating shuck-carrier provided with the upper surfaces $a$, $b$ and $c$ on different horizontal planes, and with the shoulders $d$, and $e$.

15. A shuck-opener including two parallel plane portions, two diagonally-recessed portions, and two portions converging from the recessed portions to the plane portions.

16. The combination with a reciprocating shuck-feeder, of a shuck-opener in the path thereof, and a yielding depressor bearing upon the shuck in said opener.

In testimony whereof I have hereunto affixed my signature in the presence of two subscribing witnesses.

JOSEPH C. DONNELLY.

Witnesses:
JOHN R. NOLAN,
ANDREW V. GROUPE.